United States Patent
Oka et al.

(10) Patent No.: US 10,843,249 B2
(45) Date of Patent: Nov. 24, 2020

(54) MACHINING APPARATUS

(71) Applicant: HONDA MOTOR CO., LTD., Tokyo (JP)

(72) Inventors: Keiichiro Oka, Tochigi-ken (JP); Takayuki Motojima, Tochigi-ken (JP); Yosuke Komatsu, Tochigi-ken (JP); Yasuhiro Kinoshita, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 16/142,006

(22) Filed: Sep. 26, 2018

(65) Prior Publication Data

US 2019/0099798 A1    Apr. 4, 2019

(30) Foreign Application Priority Data

Sep. 29, 2017   (JP) .................. 2017-192084

(51) Int. Cl.
| | | |
|---|---|---|
| *B21D 28/32* | (2006.01) | |
| *B26F 1/00* | (2006.01) | |
| *B21D 28/00* | (2006.01) | |
| *H02G 1/12* | (2006.01) | |
| *B21D 28/02* | (2006.01) | |

(52) U.S. Cl.
CPC ............. *B21D 28/32* (2013.01); *B26F 1/00* (2013.01); *B21D 28/002* (2013.01); *B21D 28/02* (2013.01); *H02G 1/1248* (2013.01)

(58) Field of Classification Search
CPC .... B21D 28/32; B21D 28/325; B21D 28/343; B21D 28/24; B21D 28/243; B21D 28/02;
(Continued)

(56) References Cited

U.S. PATENT DOCUMENTS

| | | | | |
|---|---|---|---|---|
| 3,194,280 A | * | 7/1965 | Jorgensen ............... | H01R 43/00 140/93 R |
| 3,785,235 A | * | 1/1974 | Peddinghaus .......... | B21D 28/04 83/448 |

(Continued)

FOREIGN PATENT DOCUMENTS

| | | |
|---|---|---|
| CN | 206146666 | 5/2017 |
| JP | 52-162585 | 12/1977 |

(Continued)

OTHER PUBLICATIONS

Japanese Office Action for Japanese Patent Application No. 2017-192084 dated Jun. 18, 2019.
(Continued)

*Primary Examiner* — Teresa M Ekiert
*Assistant Examiner* — Sarkis A Aktavoukian
(74) *Attorney, Agent, or Firm* — Amin, Turocy & Watson, LLP

(57) ABSTRACT

A machining apparatus includes a movement direction converting mechanism that converts lowering movement of a first punch into raising movement of a second punch and converts lowering movement of the second punch into raising movement of the first punch. The first punch and the second punch are raised and lowered in an alternating manner by this movement direction converting mechanism. Accordingly, machining by the first punch and machining by the second punch are performed individually.

7 Claims, 7 Drawing Sheets

(58) Field of Classification Search
CPC .... B21D 45/006; B21D 45/003; B21D 45/00;
B21D 19/086; B21D 24/005; B21D
31/005; B21D 43/05; B30B 1/26; B30B
1/261; B30B 1/266; B30B 1/28; B30B
11/228; H02G 1/1248; H02G 1/12; H02G
1/1251; B26F 1/00
USPC .................. 72/429, 452.1, 452.2, 452.4, 434
See application file for complete search history.

(56) References Cited

U.S. PATENT DOCUMENTS

| | | | | |
|---|---|---|---|---|
| 6,053,027 | A | * | 4/2000 | Yoshizawa ................ B30B 1/06 72/442 |
| 6,305,279 | B1 | * | 10/2001 | Telkamp ................. B30B 1/261 100/193 |
| 6,546,617 | B1 | * | 4/2003 | Hayashi ............... H02G 1/1202 29/426.4 |
| 7,153,128 | B2 | * | 12/2006 | Hasegawa ............... B29C 33/22 425/590 |

FOREIGN PATENT DOCUMENTS

| | | |
|---|---|---|
| JP | 11-320189 | 11/1999 |
| JP | 2001-353534 | 12/2001 |
| JP | 2008-188656 | 8/2008 |

OTHER PUBLICATIONS

Chinese Office Action for Chinese Patent Application No. 201811151907.2 dated Nov. 1, 2019.

\* cited by examiner

34

MACHINING APPARATUS

CROSS-REFERENCE TO RELATED APPLICATION

This application is based upon and claims the benefit of priority from Japanese Patent Application No. 2017-192084 filed on Sep. 29, 2017 the contents of which are incorporated herein by reference.

BACKGROUND OF THE INVENTION

Field of the Invention

The present invention relates to a machining apparatus for performing prescribed machining on a workpiece.

Description of the Related Art

A machining apparatus is known that performs punching or cutting on two workpieces individually. As described in Japanese Laid-Open Patent Publication No. 2001-353534, in this case, the machining apparatus includes two sets of punches and dies, and while the prescribed machining is performed with one set of a punch and a die, the remaining set of a punch and a die is in a standby state. Then, when the machining with the one set of a punch and a die is finished, the punch is raised and placed in a standby state, and prescribed machining is applied using the remaining set of a punch and a die.

SUMMARY OF THE INVENTION

In the prior art described in Japanese Laid-Open Patent Publication No. 2001-353534, by providing each of two shafts with a cam and manipulating a switching knob connected to the two shafts to perform cam switching, the punch to be raised and the punch to be lowered are switched to perform the prescribed machining. When applying the prescribed machining through a switching mechanism in this manner, the machining thrust has an effect on the switching mechanism.

Therefore, for punching machining or the like of a metal material that requires a large amount of machining thrust, it is necessary to ensure sufficient hardness for the switching mechanism as well, and so the apparatus becomes larger and heavier.

Furthermore, with this machining apparatus, the switching mechanism is attached to a raising/lowering moving section, and therefore the raising/lowering moving section has a large amount of inertia. Due to this, there are problems that a large amount of thrust is needed to drive the machining apparatus, and large vibrations occur. Furthermore, there is an idea to attach a motor or the like to automate the switching, but in such a case, the motor is arranged on the moving section, and therefore there is a problem that wires thereof are prone to being broken.

It is an object of the present invention to provide a machining apparatus in which the moving section is small, is lightweight, and has a high degree of hardness, by including a space-saving switching mechanism in a fixed portion.

It is another object of the present invention to provide a machining apparatus that can realize a reduction in the necessary machining thrust and in vibration.

According to a first embodiment of the present invention, a machining apparatus includes a first punch and a second punch driven individually, lowers the second punch when the first punch is raised, and raises the second punch when the first punch is lowered. The machining apparatus comprises a movement direction converting mechanism that converts lowering movement of the first punch into raising movement of the second punch and converts lowering movement of the second punch into raising movement of the first punch. The first punch and the second punch are raised and lowered in an alternating manner, and machining by the first punch and machining by the second punch are performed individually.

In this way, with the present invention, when one of the first punch and the second punch is lowered, the other is raised with a symmetrical movement trajectory.

Therefore, by attaching the movement direction converting mechanism, it is possible to use the machining thrust of one of the punches as return thrust for the other punch. In other words, there is no need for a pulling mechanism to raise the punches. Therefore, it is possible to make the machining apparatus smaller and to reduce the load during machining.

Furthermore, the second punch is lowered when the first punch is raised and, inversely, the second punch is raised while the first punch is lowered. Therefore, a relatively large amount of clearance is formed between the raised punch and the lowered punch, so that it is easy to perform maintenance such as replacing the punches.

A cam may be used, for example, to automatically raise one of the first punch and the second punch when the other is lowered. More specifically, the machining apparatus may comprise a first cam for raising the first punch; a second cam for raising the second punch; a rotating shaft provided with the first cam and the second cam; and a rotational drive source that causes the rotating shaft to rotate. In addition, the movement direction converting mechanism may include a first arm member that pivots about one end thereof under the effect of the first cam; a first raising/lowering member that is raised and lowered according to the pivoting of the first arm member; a second arm member that pivots about one end thereof under the control of the second cam; a second raising/lowering member that is raised and lowered according to the pivoting of the second arm member; and a link member that has one end supported by the first raising/lowering member and another end supported by the second raising/lowering member, and pivots about a central portion arranged between the first raising/lowering member and the second raising/lowering member.

As described above, it is possible to use the machining thrust of one of the punches as the return thrust for the other punch, and therefore there is no need for a pulling mechanism to raise the punches. Because of this, it is possible to use so-called plate cams as the first cam and the second cam, and it is also possible to reduce the diameters of these cams.

Furthermore, by including two cams as a pair on a rotating shaft connected to a rotational drive source, a two-shaft output mechanism is realized that can switch the output shaft according to the rotational direction of the rotational drive source. In this way, it is possible for the machining thrust to be directly supported by the rotating shaft connected to the rotational drive source, and so it is possible to withstand a large amount of machining thrust. Furthermore, since a switching mechanism is not included in the raising/lowering movement section, the inertia of the raising/lowering movement section is reduced. As a result, it is possible to drive the raising/lowering movement section at high speed. In addition, by giving the first cam and the second cam a completely symmetric profile, it is possible to cancel out inertial forces and restrict vibration.

The movement direction converting mechanism may be a rack and pinion mechanism. In this case, a first rack for raising and lowering the first punch and a second rack for raising and lowering the second punch may be provided, and one pinion may engage with both the first rack and the second rack. In this way, it is possible to raise one of the punches in accordance with the lowering operation of the other punch.

The first punch and the second punch may perform different machining from each other. In this case, it is possible to perform different types of machining on different locations on the same workpiece or on separate workpieces.

In this case, instead of using one die, it is preferable to use a first die that applies machining together with the first punch and a second die that applies machining together with the second punch. Furthermore, the first die and the second die may be able to individually be displaced in a direction to be closer to or farther from the respective first punch and second punch. With such a configuration, when performing cutting machining with both the first punch and the second punch, the cutting machining can be performed more easily than in a case where the die is positionally fixed and does not move.

According to the present invention, when one of the first punch and the second punch is lowered, the other is raised with a symmetrical movement trajectory by the movement direction converting mechanism. Essentially, by attaching the movement direction converting mechanism, it is possible to use the machining thrust of one of the punches as return thrust for the other punch. In other words, there is no need for a pulling mechanism to raise the punches. Therefore, it is possible to make the machining apparatus smaller and to reduce the load during machining.

Furthermore, since one punch is lowered when the other punch is raised, a relatively large amount of clearance is formed between the punches. Since it is easy to insert tools or the like into this clearance, it is easy to perform maintenance such as replacing the punches.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes the present invention while providing examples of preferred embodiments and referencing the accompanying drawings.

Figure 1:
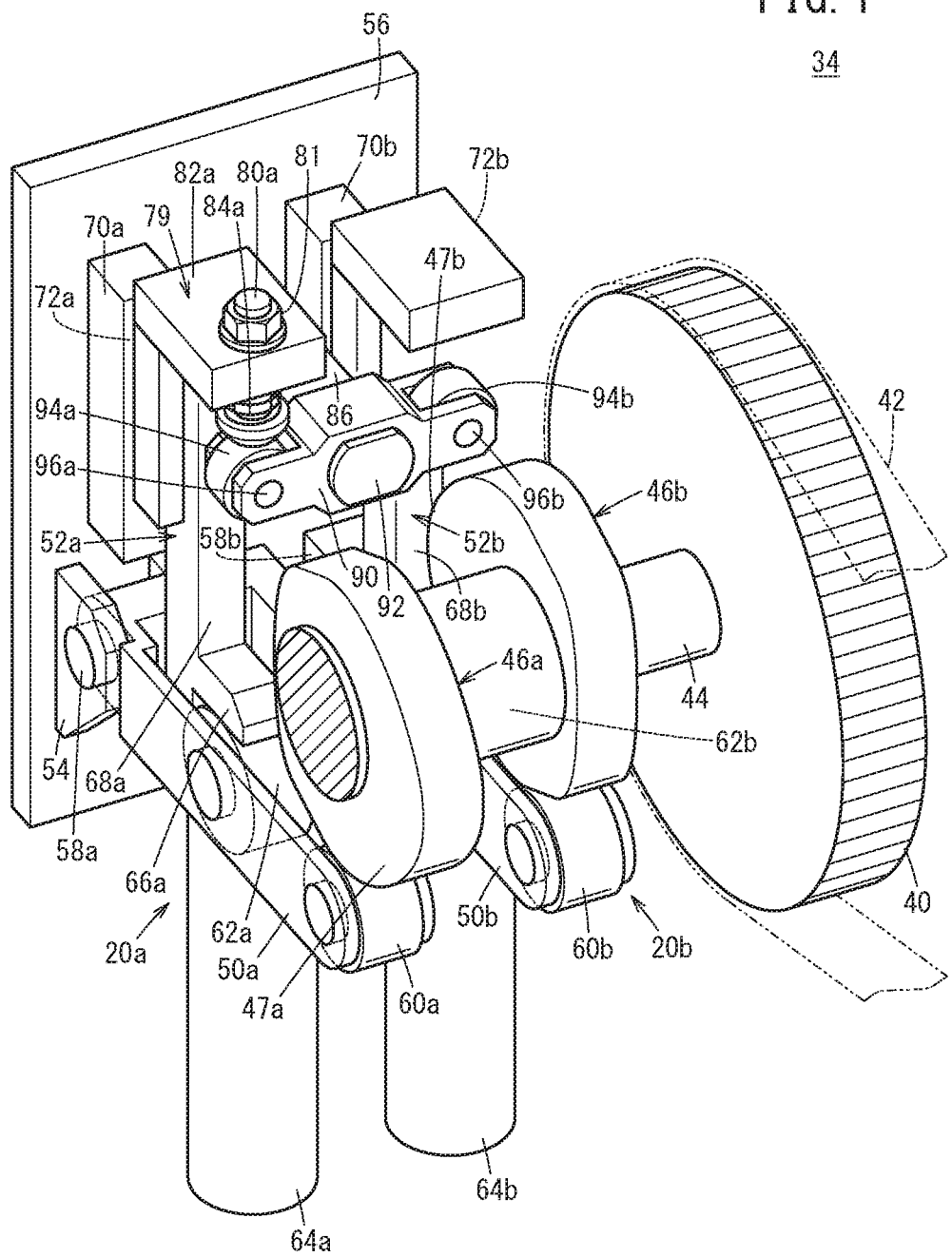
FIG. 1 is a schematic perspective view of the main parts of a machining apparatus according to an embodiment of the present invention.
Figure 2:
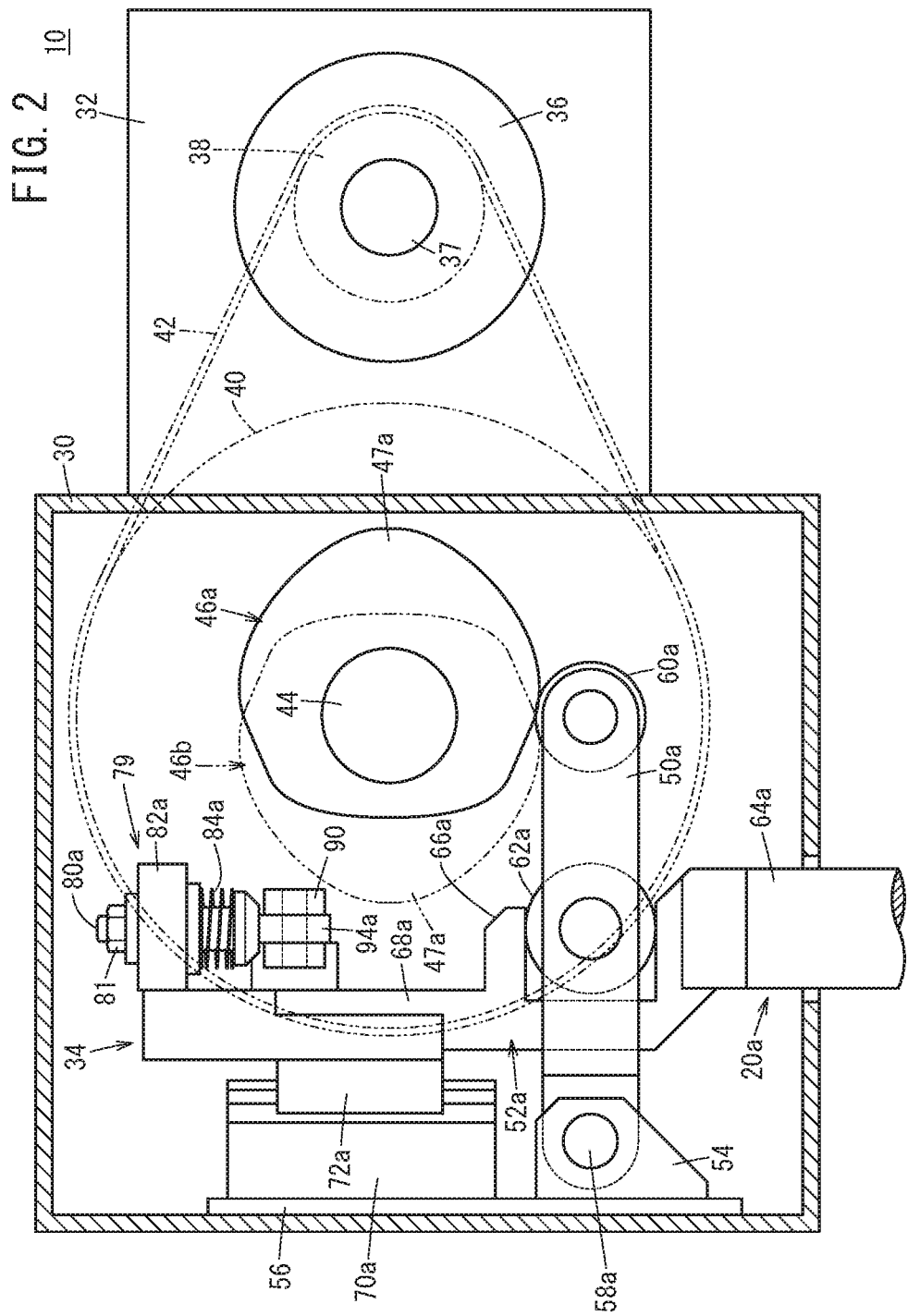
FIG. 2 is a side cross-sectional view of the main parts of the machining apparatus of FIG. 1.
Figure 3:
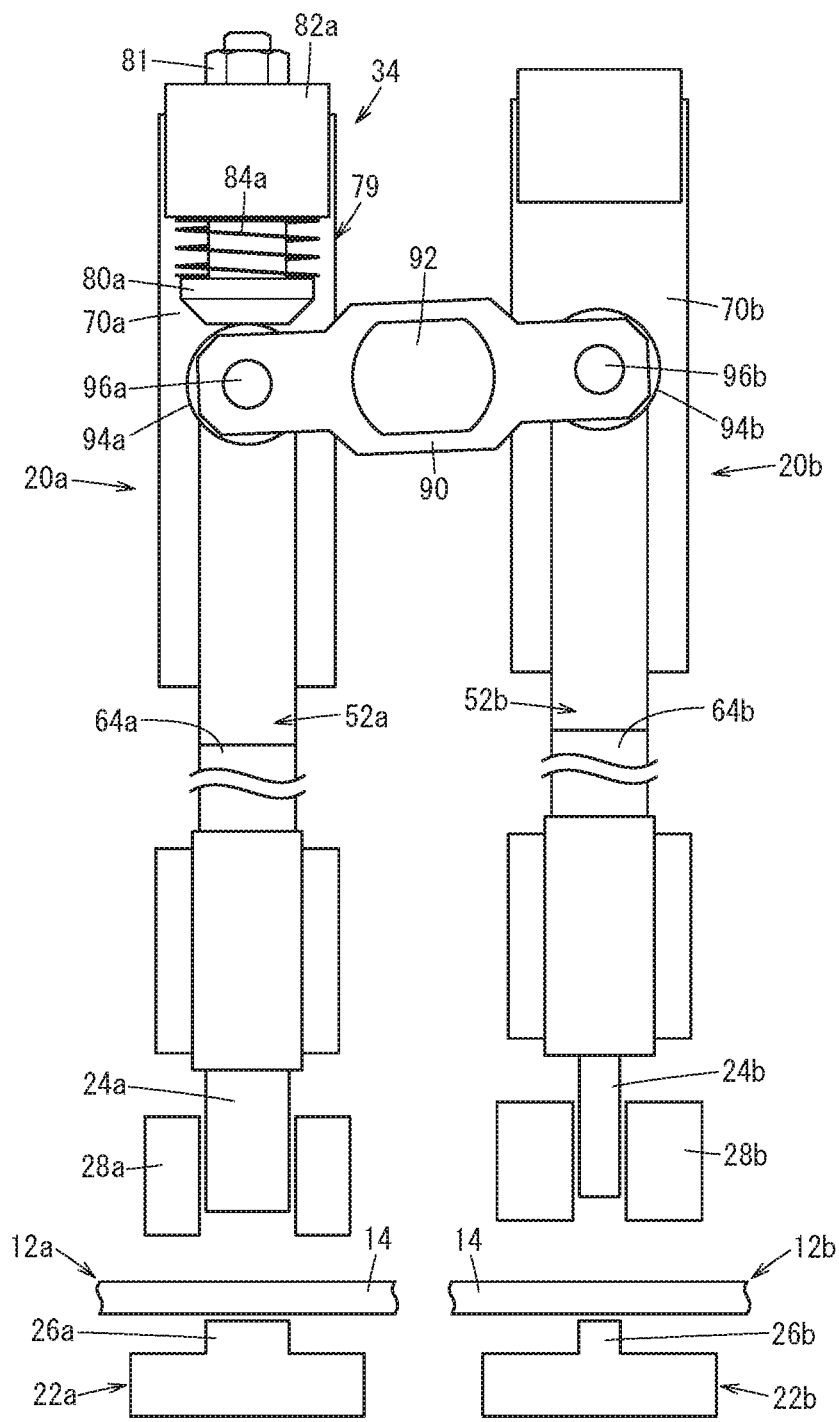
FIG. 3 is a partially omitted front view of the main parts of the machining apparatus of FIG. 1.

FIG. 1 to FIG. 3 are respectively a schematic perspective view, a side cross-sectional view, and a partially omitted front view of the main parts of a machining apparatus 10 according to the present embodiment. This machining apparatus 10 includes a first cutting mechanism 20*a* and a second cutting mechanism 20*b* for individually performing cutting machining to cut away insulation coating 14 respectively from a first conductor 12*a* and a second conductor 12*b* (see FIG. 3) serving as workpieces. The first cutting mechanism 20*a* is formed to include a first die 22*a* and a first punch 24*a* facing each other, and in a similar manner, the second cutting mechanism 20*b* is formed to include a second die 22*b* and a second punch 24*b* facing each other.

In the first cutting mechanism 20*a*, the insulation coating 14 is removed from across a wide range of the first conductor 12*a*. On the other hand, in the second cutting mechanism 20*b*, the insulation coating 14 is removed from the second conductor 12*b* across a range that is narrower than that of the first conductor 12*a*. In other words, in the present embodiment, cutting machining with different cutting removal amounts (cutting amounts) is applied individually to workpieces by the first cutting mechanism 20*a* and the second cutting mechanism 20*b*, and as a result, different products are obtained.

The first die 22*a* and the second die 22*b* are respectively provided with a first die raising/lowering mechanism and a second die raising/lowering mechanism (e.g. a cylinder, ball screw mechanism, or the like), not shown in the drawings, such that the first die 22*a* and the second die 22*b* can be raised and lowered individually. The first die 22*a* is lowered when the first punch 24*a* and second die 22*b* are raised, and is raised when the first punch 24*a* and the second die 22*b* are lowered. On the other hand, the second die 22*b* is lowered when the second punch 24*b* and the first die 22*a* are raised, and is raised when the second punch 24*b* and the first die 22*a* are lowered. The configurations of the punch raising/lowering mechanisms for raising and lowering the first punch 24*a* and the second punch 24*b* are described further below.

A first mounting section 26*a* on which the first conductor 12*a* is mounted is formed on the top end surface of the first die 22*a*, protruding toward the first punch 24*a* side (i.e. upward). On the other hand, a first backup guide 28*a* is provided on the outside of the first punch 24*a*. The first punch 24*a* faces the first mounting section 26*a*, and the first backup guide 28*a* presses width-direction end portions of the first conductor 12*a*. The first conductor 12*a* undergoes the cutting machining while sandwiched between the raised first die 22*a* and the lowered first punch 24*a*.

In a similar manner, a second mounting section 26*b* on which the second conductor 12*b* is mounted is formed on the top end surface of the second die 22*b*, protruding toward the second punch 24*b* side (i.e. upward), and the second punch 24*b* faces the second mounting section 26*b*. Furthermore, a second backup guide 28*b* is provided on the outside of the second punch 24*b*, and presses the width-direction end portions of the second conductor 12*b*. The second conductor 12*b* undergoes the cutting machining while sandwiched between the raised second die 22*b* and the lowered second punch 24*b*.

The following describes the punch raising/lowering mechanism for raising and lowering the first punch 24a and the second punch 24b, with reference particularly to FIG. 1 and FIG. 2.

The machining apparatus 10 includes a housing 30 and a motor support board 32 that is supported on this housing 30 (see FIG. 2). A movement direction converting mechanism 34 that forms the punch raising/lowering mechanism is housed in the housing 30, while a drive motor 36 serving as a rotational drive source is supported on the motor support board 32. A drive pulley 38 with a small diameter is provided to a motor rotating shaft 37 of the drive motor 36, and a timing belt 42 is wound around this drive pulley 38 and a driven pulley 40 that has a large diameter and is provided in the housing 30.

One end of a cam rotating shaft 44 (rotating shaft) is embedded in the center of the driven pulley 40. This cam rotating shaft 44 extends to the first cutting mechanism 20a and the second cutting mechanism 20b (see FIG. 1). This cam rotating shaft 44 is provided with a first eccentric cam 46a (first cam) and a second eccentric cam 46b (second cam), which are plate cams. It is obvious that the first eccentric cam 46a and the second eccentric cam 46b rotate integrally with the cam rotating shaft 44. A cam portion 47a of the first eccentric cam 46a and a cam portion 47b of the second eccentric cam 46b are arranged such that the phase difference therebetween is approximately 180°.

The movement direction converting mechanism 34 includes a first arm member 50a, a first raising/lowering member 52a, a second arm member 50b, and a second raising/lowering member 52b. Among these, the first arm member 50a and the second arm member 50b are supported by the housing 30 via shaft stopping members 54 and a support plate 56. Specifically, the support plate 56 is attached to an inner surface of the housing 30, and four shaft stopping members 54 are arranged in a line on this support plate 56. The first arm member 50a is rotatably supported by two of the shaft stopping members 54 via a first pivoting shaft 58a and, in a similar manner, the second arm member 50b is rotatably supported by the remaining two shaft stopping members 54 via a second pivoting shaft 58b (see FIG. 2).

A first small cam follower 60a is pivotally supported on the tip of the first arm member 50a facing the first eccentric cam 46a, and a first large cam follower 62a is pivotally supported at the substantial center of the first arm member 50a in the longitudinal direction. Similarly, a second small cam follower 60b is pivotally supported on the tip of the second arm member 50b facing the second eccentric cam 46b, and a second large cam follower 62b is pivotally supported at the substantial center of the second arm member 50b in the longitudinal direction.

Here, the first cutting mechanism 20a and the second cutting mechanism 20b include a first shaft 64a and a second shaft 64b that are respectively connected to the first punch 24a and the second punch 24b. The first raising/lowering member 52a and the second raising/lowering member 52b are respectively connected to the top end portions of the first shaft 64a and the second shaft 64b.

The first raising/lowering member 52a includes a first U-shaped portion 66a that is substantially U-shaped and a first pillar-shaped portion 68a shaped as a square pillar. A first large cam follower 62a is clamped by the first U-shaped portion 66a. On the other hand, a first slider 72a that slides on a first guide rail 70a is attached to the first pillar-shaped portion 68a. The first guide rail 70a is supported by the support plate 56, in a manner to be at a prescribed distance away from a second guide rail 70b and to be parallel to the second guide rail 70b.

Furthermore, a preloading mechanism 79, which is an error absorbing mechanism for absorbing a motion trajectory error between the first raising/lowering member 52a and the second raising/lowering member 52b that are raised and lowered according to motion trajectories that are symmetrical to each other, is arranged above the first guide rail 70a. The motion trajectory error is caused by machining errors or the like of the first eccentric cam 46a and the second eccentric cam 46b, for example.

Specifically, an insertion hole, not shown in the drawings, is formed penetrating through a holder 82a along the thickness direction, and a shaft portion of a pusher 80a forming the preloading mechanism 79 is inserted through the insertion hole. A screw portion is formed on this shaft portion, and by threading a nut 81 onto this screw portion, the pusher 80a is prevented from falling out of the insertion hole. A coil spring 84a (elastic member) is interposed between a large-diameter umbrella portion of the pusher 80a and the bottom surface of the holder 82a.

The second raising/lowering member 52b is configured in a similar manner as the first raising/lowering member 52a, and includes a second U-shaped portion 66b and a second pillar-shaped portion 68b. A second large cam follower 62b is clamped by the second U-shaped portion 66b, and a second slider 72b that slides on the second guide rail 70b is attached to the second pillar-shaped portion 68b.

A support pillar portion 86 protrudes from between the first guide rail 70a and the second guide rail 70b, toward the first eccentric cam 46a and second eccentric cam 46b side. A long link member 90 is supported on the tip of this support pillar portion 86, via a third pivoting shaft 92. The third pivoting shaft 92 is positioned at a central portion of the link member 90 in the longitudinal direction, and a first roller 94a and second roller 94b are attached to the respective ends of this link member 90 in the longitudinal direction, via a first roller shaft 96a and a second roller shaft 96b. The pusher 80a faces the first roller 94a.

One end of the first roller shaft 96a and one end of the second roller shaft 96b are inserted into insertion holes (not shown in the drawings) formed respectively near the top ends of the first raising/lowering member 52a and the second raising/lowering member 52b. Therefore, the link member 90 pivots at a prescribed angle corresponding to the raising/lowering amount of the first raising/lowering member 52a and the second raising/lowering member 52b, in accordance with the first raising/lowering member 52a being raised (or lowered) while the second raising/lowering member 52b is lowered (or raised).

The machining apparatus 10 according to the present embodiment is basically configured as described above, and the following describes the operational effects thereof.

In an initial state where the cam rotating shaft 44 is not rotating, the first punch 24a and the second punch 24b are at the positions shown in FIG. 3, where the first raising/lowering member 52a and the second raising/lowering member 52b are shown in a simplified manner. From this state, in order to cut and remove the insulation coating 14 of the first conductor 12a, the first conductor 12a is mounted on the first mounting section 26a of the first die 22a. In this state, the first die 22a is raised due to the effect of the die raising/lowering mechanism and, along with this, the drive motor 36 is biased to rotate the motor rotating shaft 37 and the drive pulley 38. In accordance with this, the timing belt 42 circulates and the driven pulley 40 rotates.

Along with the rotation of the driven pulley 40, the cam rotating shaft 44 to which this pulley 40 is fitted moves rotationally. As a result, the first small cam follower 60a that contacts the cam portion 47a of the first eccentric cam 46a is pressed downward, and along with this, the tip of the first arm member 50a provided with this first small cam follower 60a is pressed downward. Therefore, the first arm member 50a pivots about the first pivoting shaft 58a such that the tip thereof points downward. Along with this pivoting, the first large cam follower 62a supported by the first arm member 50a is displaced downward.

As described above, the first large cam follower 62a is clamped by the first U-shaped portion 66a of the first raising/lowering member 52a. Accordingly, when the first large cam follower 62a is displaced downward, the first raising/lowering member 52a is lowered in accordance with this. At this time, the first slider 72a attached to the first pillar-shaped portion 68a is guided by the guide rail, and therefore the first raising/lowering member 52a is prevented from swinging in the width direction. In other words, the first raising/lowering member 52a is lowered in a straight line.

Figure 4:
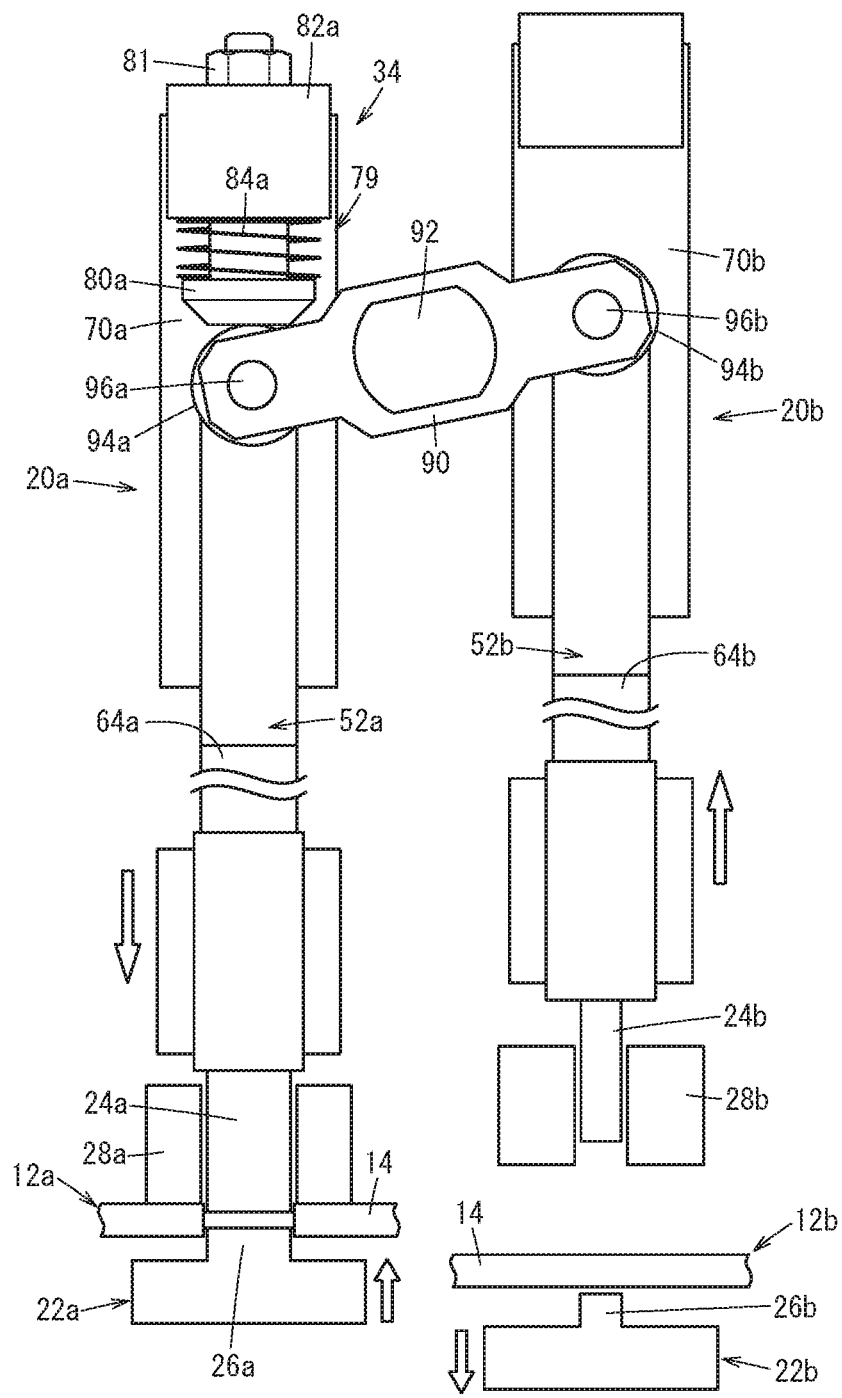
FIG. 4 is a partially omitted front view of a state in which the first punch is lowered from the state shown in FIG. 3.

Here, one end of the link member 90 is connected to the first raising/lowering member 52a via the first roller shaft 96a, and the other end of the link member 90 is connected to the second raising/lowering member 52b via the second roller shaft 96b. Accordingly, as shown in FIG. 4, the link member 90 pivots about the third pivoting shaft 92 provided at a central portion of the link member 90 such that one end thereof is lowered together with the first raising/lowering member 52a and the other end is raised. Therefore, the second raising/lowering member 52b is raised. In this way, when the first raising/lowering member 52a is lowered, the second raising/lowering member 52b is instead raised.

When the first raising/lowering member 52a is lowered, the first punch 24a and the first backup guide 28a are lowered along with the first shaft 64a. The first backup guide 28a presses the width-direction end portions of the first conductor 12a first, and then the first punch 24a performs cutting machining on the insulation coating 14 of the first conductor 12a. In other words, cutting by the first cutting mechanism 20a is performed.

When the cam rotating shaft 44 rotates further, the link member 90 pivots about the third pivoting shaft 92 such that the first raising/lowering member 52a side thereof is raised and the second raising/lowering member 52b side thereof is lowered. As a result, the first raising/lowering member 52a is slightly raised and the second raising/lowering member 52b is slightly lowered, to return to the positions shown in FIG. 3. At the time of this raising or lowering, it is obvious that the first slider 72a and the second slider 72b are respectively guided by the first guide rail 70a and the second guide rail 70b.

After this, the cam rotating shaft 44 is temporarily stopped at a rotational angle at which the first punch 24a and the second punch 24b are substantially at the center of the stroke, as shown in FIG. 3, and then rotates in a direction that is the opposite of the direction up to this point. In this way, the same cutting machining as described above is applied to the insulation coating 14 of a new first conductor 12a (see FIG. 4).

After the cutting machining has been performed on the insulation coating 14 of the first conductor 12a, the cam rotating shaft 44 is rotated further in the same direction to perform the cutting machining on the insulation coating 14 of the second conductor 12b. Along with this rotation, the tip of the second arm member 50b provided with the second small cam follower 60b is pressed downward. Accordingly, the second arm member 50b pivots about the second pivoting shaft 58b such that the tip thereof points downward.

Figure 5:
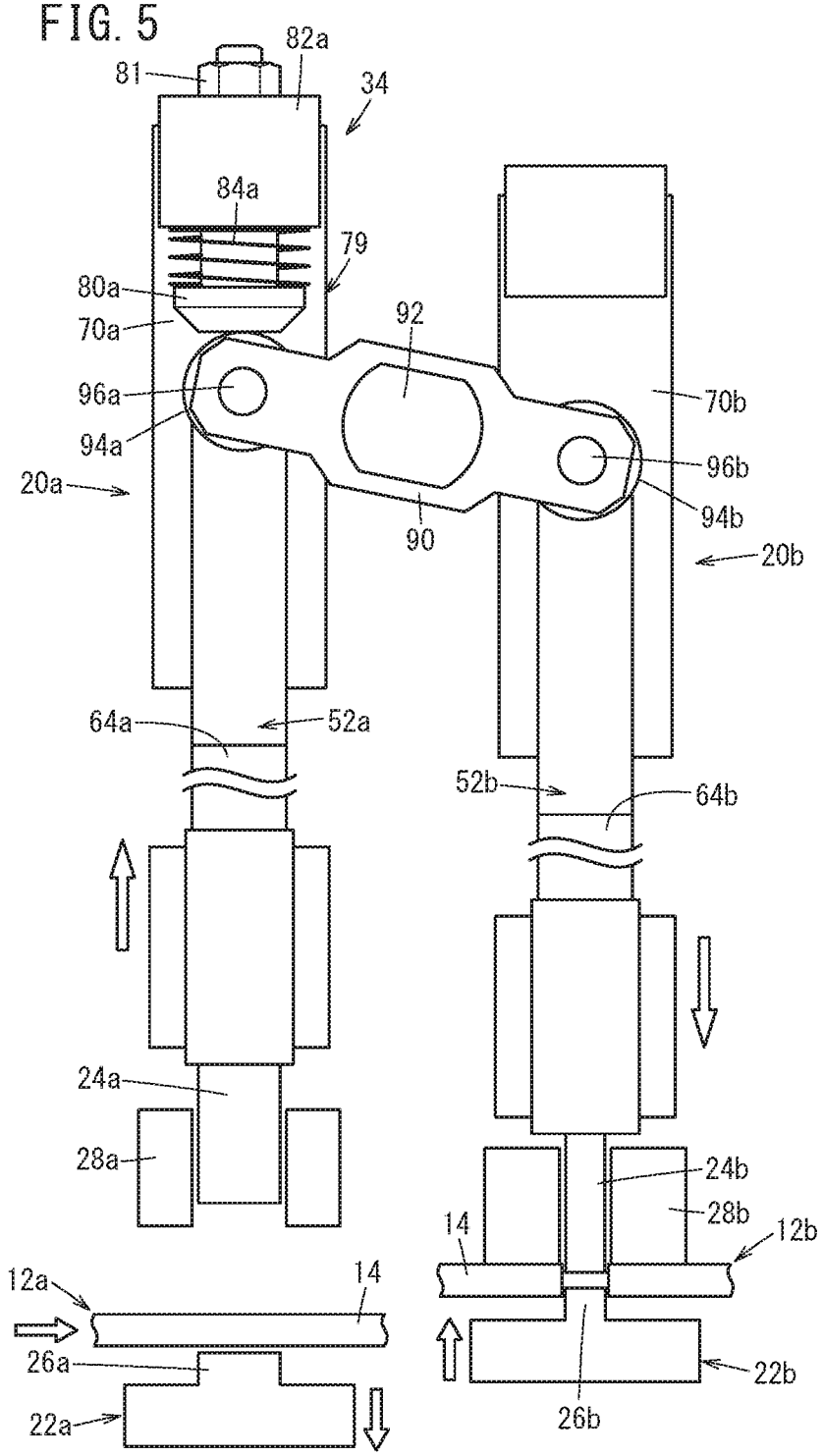
FIG. 5 is a partially omitted front view of a state in which the second punch is lowered from the state shown in FIG. 3.

Along with this pivoting, the second large cam follower 62b supported by the second arm member 50b is displaced downward, and the second raising/lowering member 52b that clamps the second large cam follower 62b with the second U-shaped portion 66b is lowered. In accordance with this lowering, as shown in FIG. 5, the link member 90 pivots about the third pivoting shaft 92 such that the other end thereof is lowered together with the second raising/lowering member 52b and the one end thereof is raised. Therefore, the first raising/lowering member 52a is raised. At this time, the one end of the link member 90 contacts a head portion of the pusher 80a via the first roller 94a. The coil spring 84a is compressed by a suitable amount corresponding to the degree by which the first raising/lowering member 52a is raised.

When the second raising/lowering member 52b is lowered, the second punch 24b and the second backup guide 28b are lowered along with the second shaft 64b. The second backup guide 28b presses the width-direction end portions of the second conductor 12b first, and then the second punch 24b performs cutting machining on the insulation coating 14 of the second conductor 12b. In other words, cutting by the second cutting mechanism 20b is performed.

When the cam rotating shaft 44 rotates further, the link member 90 pivots about the third pivoting shaft 92 such that the first raising/lowering member 52a and the second raising/lowering member 52b return to the positions shown in FIG. 3.

Figure 6:
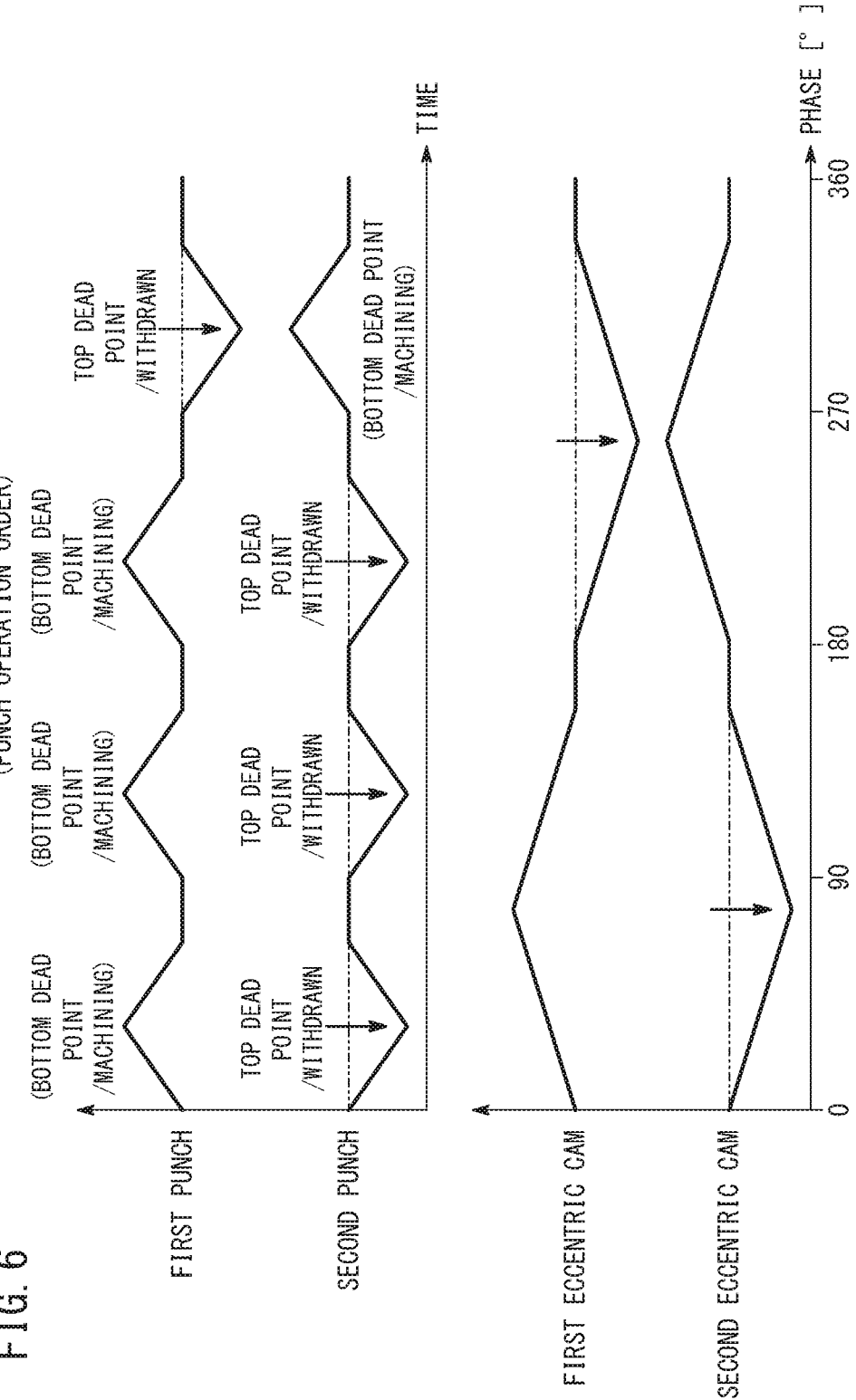
FIG. 6 is a graph of the punch operation order and the phases of the cam portions of the cams.

The raising and lowering operation of the first punch 24a and the second punch 24b described above and the phases of the cam portions 47a and 47b of the first eccentric cam 46a and the second eccentric cam 46b are shown in a graph in FIG. 6. From FIG. 6, it is understood that when one of the first punch 24a and the second punch 24b is raised, the other is lowered, and that the first eccentric cam 46a and the second eccentric cam 46b moves completely symmetrically.

In this way, in the present embodiment, the raising movement of the first punch 24a is converted into lowering movement of the second punch 24b by the movement direction converting mechanism 34, and the lowering movement of the first punch 24a is converted into raising movement of the second punch 24b by the movement direction converting mechanism 34. Specifically, the link member 90 pivots about the third pivoting shaft 92 such that the other end thereof is lowered and the one end thereof is raised. The return thrust is small compared to the machining thrust, and therefore it is sufficiently possible for the first punch 24a or second punch 24b to be returned by the movement direction converting mechanism 34.

In this way, the first punch 24a and the second punch 24b are raised or lowered in an alternating manner, and therefore it is possible to apply the cutting machining continuously to a new first conductor 12a or second conductor 12b.

In other words, it is possible to use the machining thrust of the first punch 24a as the return thrust of the second punch 24b, and also to use the machining thrust of the second punch 24b as the return thrust of the first punch 24a. In other words, return thrust is guaranteed to be generated for the first punch 24a and the second punch 24b. Therefore, it is possible to use so-called plate cams as the first eccentric cam 46a and the second eccentric cam 46b, and also to reduce the diameters of these cams.

Furthermore, it is only necessary to provide the first eccentric cam 46a and the second eccentric cam 46b on the same cam rotating shaft 44, and there is no need to independently prepare a rotating shaft around which the first eccentric cam 46a is fit and a rotating shaft around which the second eccentric cam 46b is fit. For the reasons described above, it is possible to make the machining apparatus 10 smaller and to reduce the load during machining.

Furthermore, by temporarily stopping the first punch 24a and the second punch 24b at substantially the center of the stroke as shown in FIG. 3 and setting the rotational direction of the cam rotating shaft 44 at this time, it is possible to select which of the first conductor 12a and the second conductor 12b the cutting machining will be performed on next. If this rotational direction is input in advance as a command to a control circuit, the cam rotating shaft 44 automatically rotates or stops rotating, and therefore it is easy to perform the cutting machining at high speed. In addition, the second punch 24b and the second shaft 64b are lowered when the first punch 24a and the first shaft 64a are raised and, inversely, the second punch 24b and the second shaft 64b are raised when the first punch 24a and the first shaft 64a are lowered. Therefore, a relatively large amount of clearance is formed between the raised punch and shaft and the lowered punch and shaft. Accordingly, it is easy to perform maintenance on the punches and shafts.

The present invention is not limited to the embodiments described above, and various alterations can be made without deviating from the scope of the present invention.

For example, a further pulley may be provided to the motor rotating shaft 37 and a movement direction converting mechanism 34 similar to the one described above may be provided to the first die 22a and the second die 22b, in order to raise and lower the first die 22a and the second die 22b.

Figure 7:
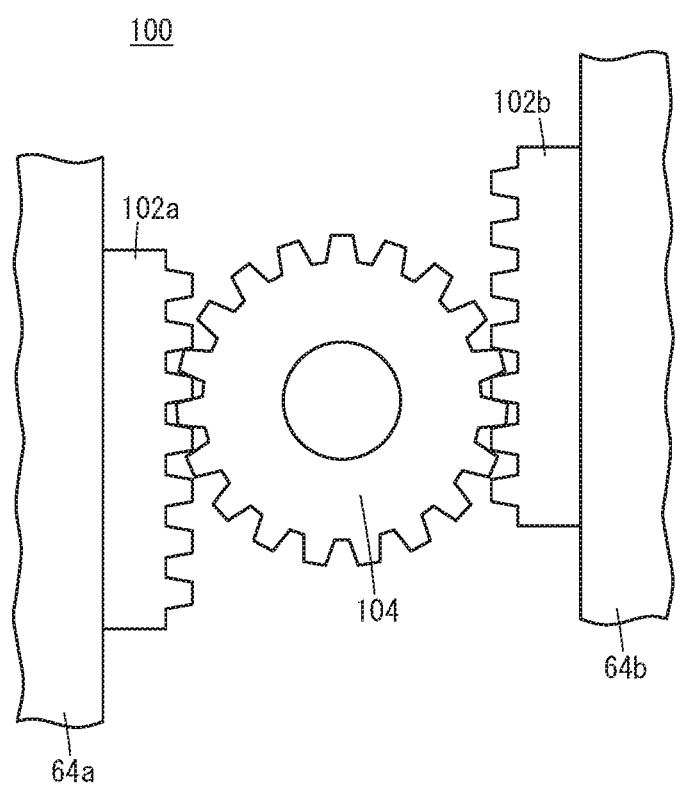
FIG. 7 is a partially omitted front view of the main parts of another movement direction converting mechanism.

Furthermore, as shown in FIG. 7, a movement direction converting mechanism 100 may be formed by a rack and pinion mechanism. In this case, a first rack 102a and a second rack 102b are preferably provided respectively to the first shaft 64a and the second shaft 64b, and one pinion 104 preferably engages with both the first rack 102a and the second rack 102b.

Yet further, machining other than cutting machining may be performed. In whichever case, it is possible to apply different types of machining to different locations on the same workpiece. Alternatively, the same component may be used as the first punch 24a and the second punch 24b, and the same machining may be applied to the same workpiece or separate workpieces.

Yet further, the machining may be performed using the first punch 24a and the second punch 24b with a shared die. In this case, the position of the die is fixed, and only the first punch 24a and the second punch 24b need to be displaced.

What is claimed is:

1. A machining apparatus that includes a first punch and a second punch driven individually, wherein the machining apparatus lowers the second punch when the first punch is raised, and the machining apparatus raises the second punch when the first punch is lowered, the machining apparatus comprising:
a first cam adapted to raise the first punch;
a second cam adapted to raise the second punch;
a rotating shaft provided with the first cam and the second cam;
a rotational driver that causes the rotating shaft to rotate; and
a movement direction converting mechanism that converts lowering movement of the first punch into raising movement of the second punch and converts lowering movement of the second punch into raising movement of the first punch, wherein
the first punch and the second punch are raised and lowered in an alternating manner, and machining by the first punch and machining by the second punch are performed individually,
the movement direction converting mechanism includes:
a first arm member that is caused to pivot about one end thereof by the first cam;
a first raising/lowering member that is raised and lowered according to the pivoting of the first arm member;
a second arm member that is caused to pivot about one end thereof by the second cam;
a second raising/lowering member that is raised and lowered according to the pivoting of the second arm member; and
a link member that has one end supported by the first raising/lowering member and another end supported by the second raising/lowering member, and the link member pivots about a central portion arranged between the first raising/lowering member and the second raising/lowering member.

2. The machining apparatus according to claim 1, comprising:
an elastic member that is arranged at a position facing the one end of the link member and is pressed by the one end of the link member and compressed.

3. The machining apparatus according to claim 1, wherein the first punch and the second punch perform different machining from each other.

4. The machining apparatus according to claim 1, wherein the movement direction converting mechanism includes a first rack adapted to raise and lower the first punch, a second rack adapted to raise and lower the second punch, and one pinion that engages with both the first rack and the second rack.

5. The machining apparatus according to claim 4, wherein the first punch and the second punch perform machining to remove an insulation coating from conductors by different amounts.

6. The machining apparatus according to claim 4, comprising:
a first die that applies machining together with the first punch and a second die that applies machining together with the second punch, wherein
the first die and the second die is individually displaceable in a direction to be closer to or farther from the respective first punch and second punch.

7. The machining apparatus according to claim 6, wherein the first die is lowered when the second die is raised, and the first die is raised when the second die is lowered.

* * * * *